United States Patent
Seefeld

(10) Patent No.: US 6,597,755 B2
(45) Date of Patent: Jul. 22, 2003

(54) APPARATUS AND METHOD FOR INSTALLING NUCLEAR REACTORS

(75) Inventor: Leroy Paul Seefeld, 1081 Mokuhano St., Honolulu, HI (US) 96825

(73) Assignee: Leroy Paul Seefeld, Honolulu, HI (US)

( * ) Notice: Subject to any disclaimer, the term of this patent is extended or adjusted under 35 U.S.C. 154(b) by 0 days.

(21) Appl. No.: 10/177,241

(22) Filed: Jun. 21, 2002

(65) Prior Publication Data

US 2003/0007589 A1 Jan. 9, 2003

Related U.S. Application Data

(60) Provisional application No. 60/303,480, filed on Jul. 6, 2001.

(51) Int. Cl.[7] .................................................. G21C 9/00
(52) U.S. Cl. ........................ 376/274; 376/275; 376/276; 376/280; 376/273; 376/909; 376/912; 376/914; 405/128; 405/129; 405/150.1; 294/82.29; 294/82.36; 294/82.24; 294/82.28
(58) Field of Search ................................. 376/274, 275, 376/276, 280, 273; 405/128, 129, 150.1; 294/82.29, 82.36, 82.24, 82.28

(56) References Cited

U.S. PATENT DOCUMENTS 2,938,429 A * 5/1960 Jaglowski, Jr. et al. ... 123/24 A
3,115,194 A * 12/1963 Adams ........................ 376/273

(List continued on next page.)

FOREIGN PATENT DOCUMENTS

DE    3704466    * 9/1988

OTHER PUBLICATIONS

Kammer et al, Underground nuclear power plants with surface turbine generator, Nuclear Engineering and Design 33 (1975), pp. 308–335.*
Bowman et al, A concept of underground nuclear power plant siting for retaining post accident atmospheres, Lawrence Livermore Lab, UCRL–84191, Feb. 1981.*
Lyczkowski et al, Safety considetrerations and economic advantage of a new underground nuclear power plant design, Nuclear Engineering and Design, 53, (1979) pp. 257–261.*
Luetkehans et al, Containment configuration, Nuclear Technology, vol. 27, Dec. 1975, pp. 545–580.*

*Primary Examiner*—Michael J. Carone
*Assistant Examiner*—John Richardson
(74) *Attorney, Agent, or Firm*—Martin E. Hsia

(57) ABSTRACT

A nuclear power plant (18) and its heat exhanger (26) are enclosed in an envelope (22) which is suspended above a bored shaft (14) from a support stem (30). When appropriate, the stem (30) can be melted by a furnace (34) to drop the envelope (22) to the bottom of the shaft (14). Sand (42) can then be dropped onto the envelope (22) through a drainage pipe (46). While the nuclear power plant (18) is operating and suspended in the shaft, spent fuel rods (70) are dropped into a sand blasting machine's hopper (130), mixed with sand and dropped into a bag (134) containing a small explosive device. The bag (134) is then dropped to the bottom of the shaft (14) and the explosive detonated to scatter the contents of the bag (134). Optionally, more sand or earth is then added to reduce heat and radiation to acceptable levels.

9 Claims, 16 Drawing Sheets

U.S. PATENT DOCUMENTS

| | | | | |
|---|---|---|---|---|
| 3,170,842 A | * | 2/1965 | Kehler | 376/160 |
| 3,214,343 A | * | 10/1965 | Natland | 376/275 |
| 3,280,923 A | * | 10/1966 | Meunch | 136/202 |
| 3,396,806 A | * | 8/1968 | Benson | 376/273 |
| 3,513,100 A | * | 5/1970 | Stogner | 166/280 |
| 3,603,107 A | * | 9/1971 | Elliott et al. | 62/459 |
| 3,755,079 A | * | 8/1973 | Weinstein et al. | 376/293 |
| 4,123,323 A | * | 10/1978 | Weber et al. | 376/260 |
| 4,189,254 A | * | 2/1980 | Akesson | 405/129.35 |
| 4,192,629 A | * | 3/1980 | Hallenius et al. | 405/129.35 |
| 4,452,478 A | * | 6/1984 | Dulaney | 294/82.32 |
| 4,762,664 A | * | 8/1988 | Wachter | 294/119.3 |
| 4,815,894 A | * | 3/1989 | Copson | 376/272 |
| 4,851,183 A | * | 7/1989 | Hampel | 376/274 |
| 5,202,522 A | * | 4/1993 | Williams | 405/129.3 |
| 5,297,917 A | * | 3/1994 | Freneix | 246/30 |
| 5,740,546 A | * | 4/1998 | Hooper | 106/738 |
| 5,863,283 A | * | 1/1999 | Gardes | 588/250 |
| 5,920,602 A | * | 7/1999 | Botzem et al. | 376/272 |
| 6,171,023 B1 | * | 1/2001 | Townshend | 405/100 |

* cited by examiner

APPARATUS AND METHOD FOR INSTALLING NUCLEAR REACTORS

This application claims the benefit of Provisional application Ser. No. 60/303,480, filed Jul. 6, 2001.

DESCRIPTION

1. Technical Field

This invention is a new approach to install, safely operate and finally dispose of a nuclear reactor (and its spent fuel) which is part of an electric power generating plant.

2. Background Art

Most nuclear reactors today are installed along with their steam turbines and electric generators in conventional industrial type buildings above ground. Industry inevitably has accidents. Nuclear accidents are catastrophic. Further, terrorists may attack or sabotage nuclear plants in order to create nuclear accidents.

Present day methods of building and operating nuclear plants are dangerous and public apprehension has almost stopped the construction of nuclear power plants. However, the world's technological advances are growing so fast that the need for electrical power can no longer be met. The environmental damage from burning fossil fuels is also becoming unacceptable. Nuclear power is therefore needed to provide the additional electrical power needed today.

Disposal of nuclear waste from nuclear reactors presents major safety and political problems, including the problem of transporting the waste from the reactor to a disposal site. During transportation, the waste will pass near or through major population centers and may be subject to accidents or terrorist acts. Thus, a method for disposing of nuclear waste without transporting it near or through population centers must be found in order to overcome these safety and political problems.

DISCLOSURE OF THE INVENTION

The invention comprises an underground vertical shaft with a nuclear reactor suspended in the shaft near the top, preferably by a single stem. A release mechanism to release the nuclear reactor is provided, so that activating the release mechanism causes the nuclear reactor to fall down to the bottom of the shaft. The release mechanism can be a furnace or explosives surrounding the stem. Preferably a drainage pipe accessible from ground level is provided that opens into the vertical shaft, and flowable material is located in the drainage pipe and adjacent to the upper end of the drainage pipe. The flowable material can be sand, gravel, pebbles, earth fill or other suitable material. Preferably an activatable gate is provided in the lower end of the drainage pipe so that when the gate is activated, the flowable material flows through the drainage pipe into the vertical shaft. Optionally, a pulverizing device for pulverizing spent nuclear fuel and for mixing the pulverized nuclear fuel with a filler is positioned in the bored shaft below the reactor, so that the mixed pulverized fuel and filler can be dropped into the shaft for disposal. A supply pipe is also provided to supply the filler, which can be sand or loose earth.

More specifically, the invention is to install a nuclear reactor underground near ground level, at the top of a deep bored vertical shaft, preferably approximately 1200 feet (approximately 365 meters) deep. The reactor would be installed in a preferably bullet shaped shell designed to be dropped down that shaft when the reactor becomes dangerous or obsolete. The entire installation can preferably be covered by a layer of reinforced concrete. This would contain and seal in any radiation that would otherwise be released by an accidental rupture of the reactor, an aerial bomb attack or a ground level bomb attack.

At the appropriate time, the reactor can be released to its final safe burial deep underground. The hole can then be filled and plugged. Any fear of radioactive contamination is reduced or eliminated.

This installation also preferably incorporates a device that pulverizes discarded fuel rods into particles and dilutes these particles with large portions of filler, such as sand or loose earth, which are then dropped to the bottom of the bored shaft. This resulting mixture does not produce unacceptable levels of heat and the radiation level is near normal background level. Preferably the radiation level is reduced to approximately that of the raw ore from which the fuel was extracted in the first place, or at least to acceptable background levels of radiation.

The pulverizing device of this invention can be used to accept and process depleted fuel rods from other nuclear reactors. These accumulated and dangerous stocks of depleted fuel rods, from installations that have no means of disposing of them, can now be rendered comparatively harmless and safe, buried deep underground.

BEST MODES FOR CARRYING OUT THE INVENTION

Electric generating plants are usually housed in conventional industrial type buildings above ground. These buildings enclose electric generators, steam turbines and a steam-producing unit. The steam-producing unit may be an oil-fired furnace, a coal burning furnace or a nuclear reactor. While the steam producing unit is usually housed together with generators and turbines, that unit functions independently.

This invention provides a support and release structure to mount a nuclear reactor underground in a prebored disposal shaft. This provides the unit with a lifetime stable working platform. At the same time it is always in a constant stand by mode, ready to be dropped and buried in case of an accidental radioactive rupture. It is also in a position to be safely disposed of when it is obsolete and must be discarded.

Figure 1:
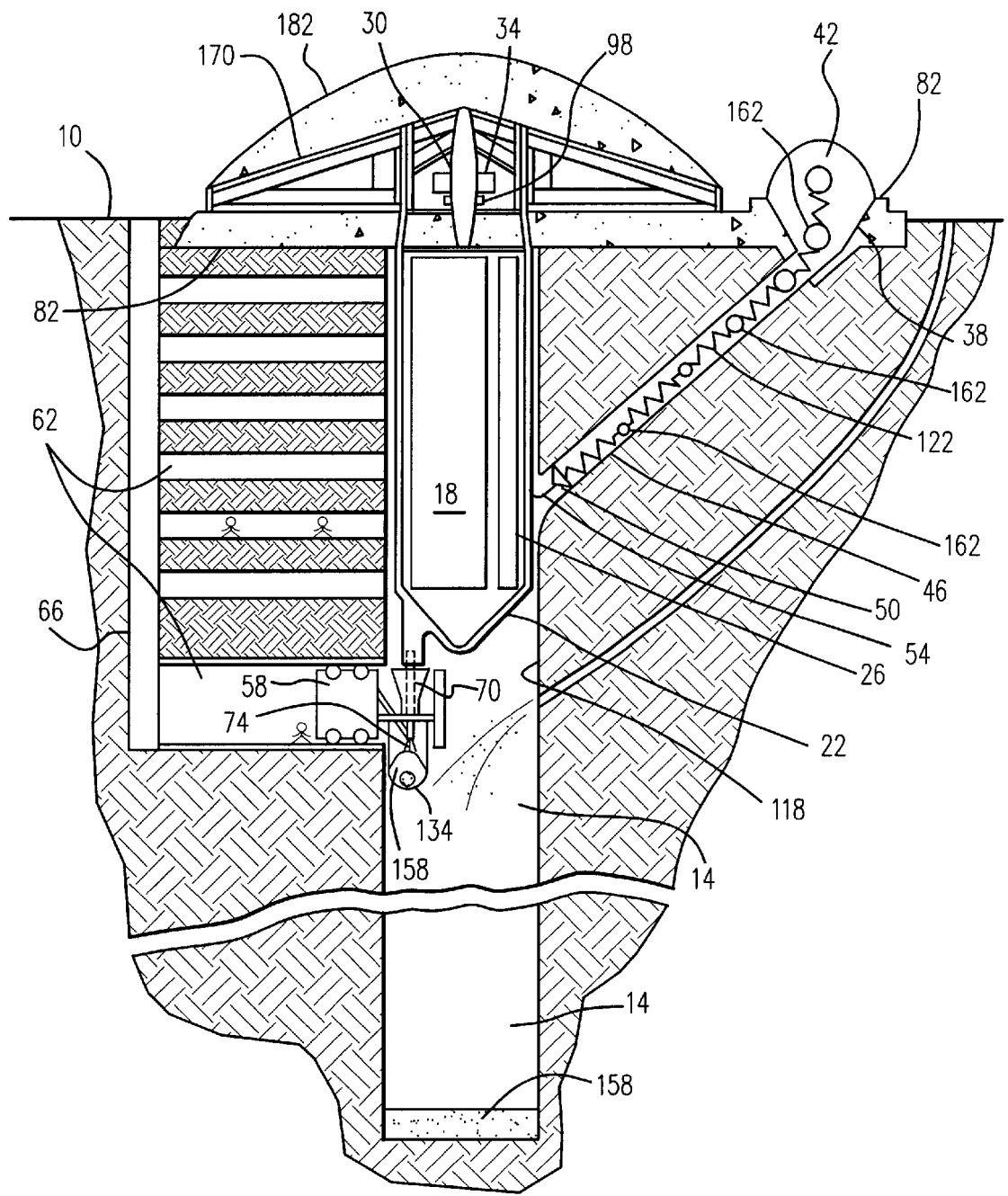
FIG. 1 is a side elevational cross-sectional view of a nuclear reactor installed underground in a bored escape shaft in anticipation of a final safe disposal.

FIG. 1 is a diagram of such an installation. Most of the installation is below ground level 10 from which the bored shaft 14 is excavated. The nuclear reactor 18 and its heat exchanger 26 are enclosed in an envelope 22 suspended in the bored shaft 14. This envelope 22 is preferably bullet shaped and designed to be dropped down that shaft. The envelope and its payload are suspended from a preferably single steel support stem 30. That stem 30 passes through a release mechanism, preferably the firebox of a preferably electric furnace 34. When that electric furnace is energized, the stem is melted and severed. The envelope 22 with its contents are then free to drop down the bored shaft 14.

Another release mechanism for severing the stem is to substitute (or add) an explosive device 98 to replace the electric furnace 34 to sever the stem.

An alternative to the single round stem is to substitute several stems of conventional steel construction forms, such as "I" beams to act as multiple stems. In this case the severing devices are preferably explosive charges. This would allow the severance to occur simultaneously at each of the multiple stems.

Returning to FIG. 1, adjacent to the bored shaft 14 are several levels of work areas 62. These provide access to the reactor for workers to control, maintain, replace fuel rods and the reactor, and to process the obsolete to be discarded fuel rods 70. These working areas are made accessible by elevator 66.

The bottom work area processes the depleted discarded fuel rods which are dropped from the reactor 18. It houses a pulverizing machine 58 to reduce those fuel rods to fine granulated particles 74. These particles at the same time are mixed with very large proportions of filler, such as sand or earth. This will dilute their heat production and radiation to lower, preferably safe, acceptable levels. This mixture 158 is then preferably collected in a bag 134 and dropped to the bottom of the shaft 14.

Above ground is a hopper 38 filled with fine grained dry sand 42. That hopper 38 channels the sand into a drainage pipe 46 which leads downward at an angle, emptying into the bored shaft 14. The sand in the pipe is held in place by a breakaway tear away gate 50. This gate is tied to the envelope 22 near its top by a cable 54. When the envelope 22 and its contents are dropped, the cable 54 tears away the breakaway gate 50, allowing the sand to flow out into the bored shaft 14 on top of the dropped enclosure 22. This layer of sand hopefully will be sufficient to contain any wayward radioactivity from a damaged reactor.

Sand mixed with even a minute amount of dampness has a tendency to cake in place and will not flow freely. To insure that the sand moves along uninterrupted, measures must be taken to eliminate anything impeding the flow of the sand through the drainage pipe 46 and the hopper 38. An enlarged diameter of the drainage pipe 46 would help. Also all units containing the sand must have their contact surfaces coated with a waterproof sealant to keep out the moisture. These units would include the breakaway tear away gate 50, the interior of the drainage pipe 46 and the contact surfaces of the cement hopper 38. A waterproof covering of the sand stored in the hopper 38 must be provided. Also, the vertical surface walls of the bored shaft 14 must be coated with a waterproof sealant 118 to a depth below the ground water. This will eliminate the possibility of contaminating the ground water with radioactivity. The sand 42 should be kiln dried before it is put into this system to eliminate moisture. Gravel or pebbles may be substituted for the sand 42.

A system of many ball shaped wire brushes 162 may preferably be located along the path of the flowing sand 42. These wire brushes should be tied to the breakaway tear away gate 50 and to the other wire brushes 162 by several long, coiled (with much slack) steel cables 122. The wire brushes 162 will preferably vary in size. They would be small at the lower end and will gradually get larger at the upper end in the hopper 38. This will break up any caking of the sand and aid the free flowing of that sand.

Figure 2:
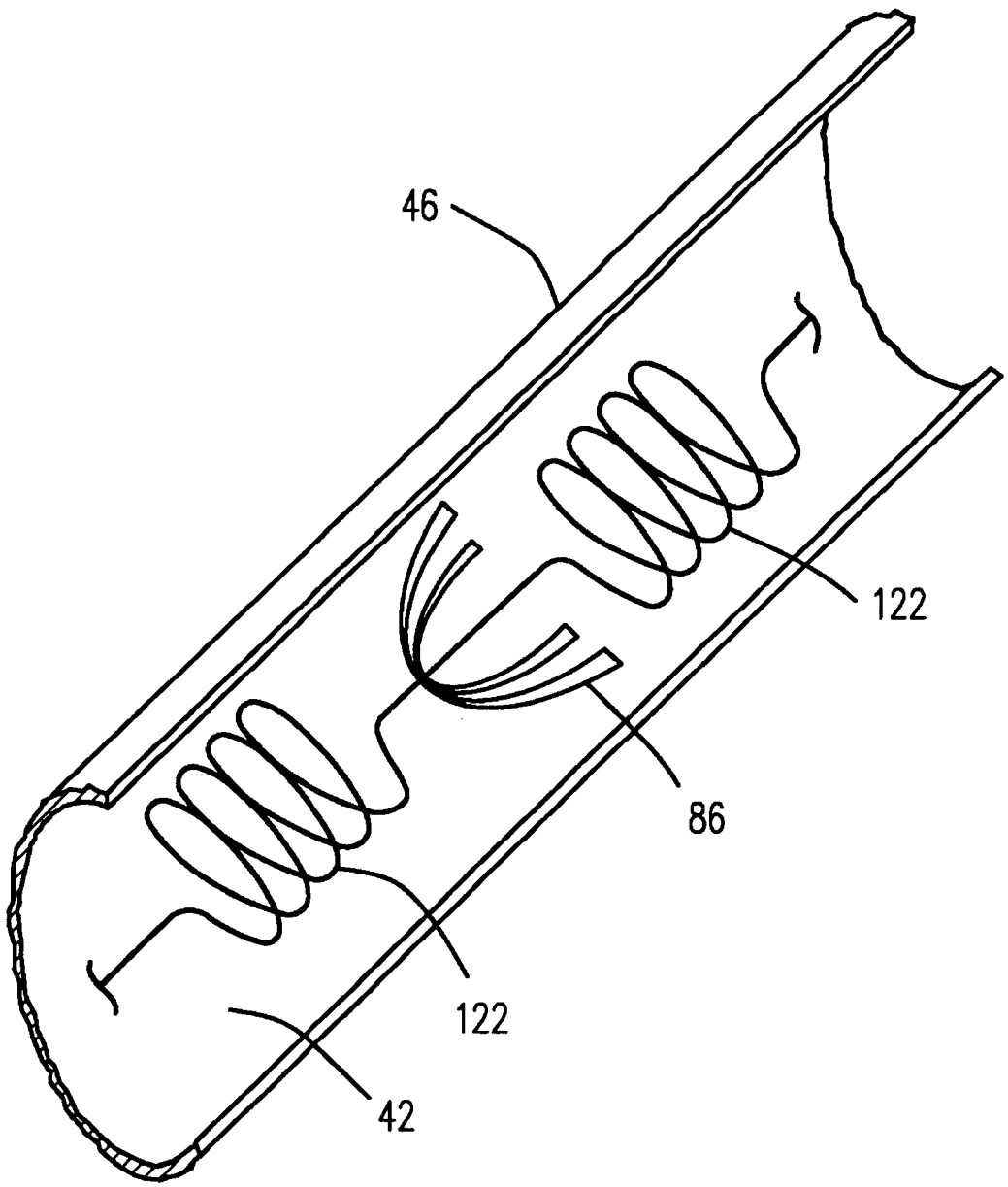
FIG. 2 is a side elevational cross-sectional view of the drainage pipe 46 of FIG. 1 showing alternative or additional steel fingers.

An alternative or supplement to the wire brushes 162 are spring steel fingers 86 shown in FIG. 2. They will pass through and loosen the sand 42. These steel fingers should vary in size. The steel fingers mounted at the lower end would be smaller. The steel fingers at the upper end in the hopper would be larger.

After the enclosure 22 and its contents have been released to fall to the bottom of the bored shaft 14, the hopper 38 can then be used as a funnel to direct earth fill from a giant power shovel or bulldozer. When the bored shaft 14 is filled with earth up to a short distance below ground level 10, the steel support structure above ground 170 may be removed and scrapped. This steel structure will not be radioactive. Then the concrete foundation 82 may be broken up and dropped down the shaft 14. The unfilled open bored shaft may then be completely filled with earth fill.

Nuclear reactors vary in size depending on their individual uses. Note the mini-reactors used in submarines and spacecraft. On the other hand there is nothing limiting the size of the reactor and its envelope. It can be large enough to accommodate almost any size desirable.

For use in an electric generating plant a medium size reactor with its heat exchanger and structure could be in the range of 4,000 tons (3,628 metric tons). This is the size of a small ocean going freighter.

The steel stem would preferably be 39 inches (100 centimeters) in diameter. The diameter of the bored shaft would preferably be approximately 60 feet (approximately 18.28 meters). The depth of the bored shaft would preferably be approximately 1200 feet (approximately 365.76 meters). This depth could vary depending on the type of nuclear reactor fuel, the makup of the subsoil and the opinions of nuclear engineers at each installation.

A thick cap 182 of concrete may be added for more protection from above ground attack or underground accidental rupture, similar to a conventional containment vessel.

Preferably, the nuclear reactor is installed from directly above.

Figure 3:
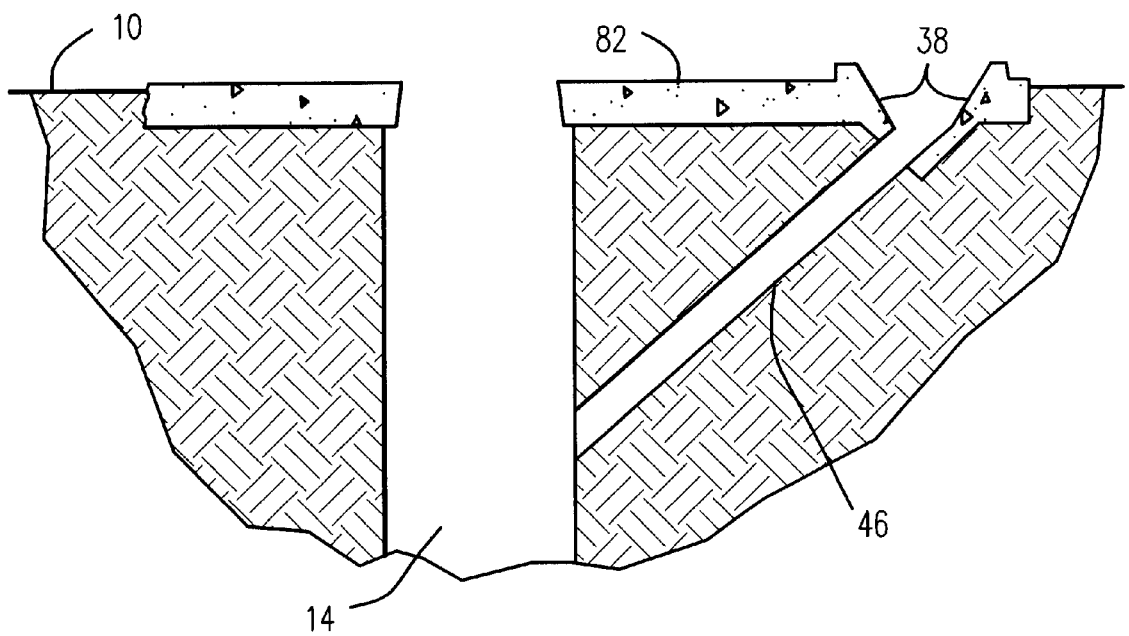
FIG. 3 is a side elevational cross-sectional view of a reinforced concrete foundation located over a bored underground shaft and incorporating a standby spillway for insulating sand.

FIG. 3 is a cross section showing the reinforced concrete foundation 82 mounted at the top of the bored shaft 14. This is required to support the entire weight of the reactor and its supporting structure.

Also shown is a cross section of the hopper 38 and its drainage pipe 46 which would be installed at the same time.

Figure 4:
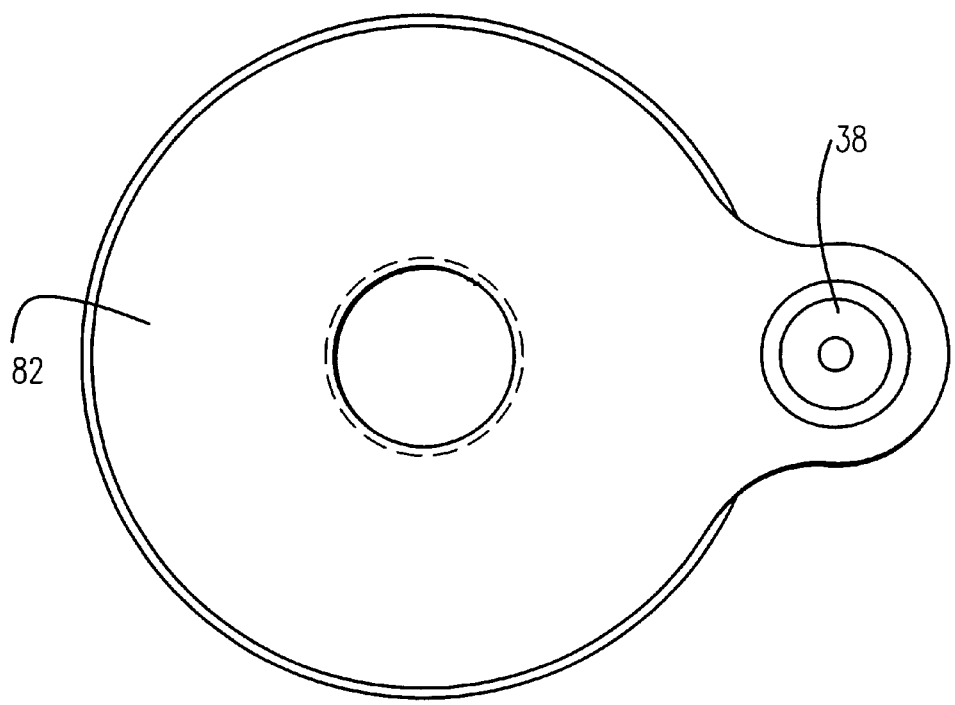
FIG. 4 is a top plan view of the concrete foundation, shaft and spillway of FIG. 3.

FIG. 4 is a view looking down at the circular reinforced concrete foundation 82. This shows the contour required to incorporate the concrete hopper 38.

Figure 5:
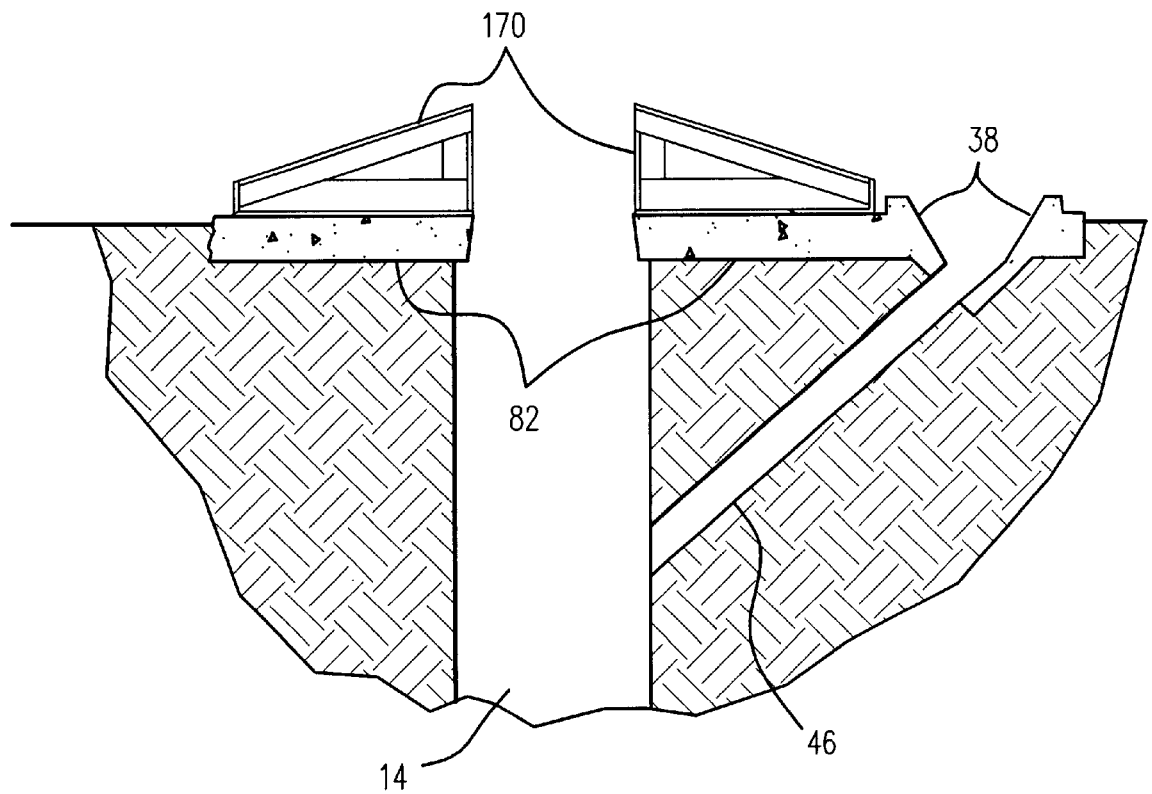
FIG. 5 is a side elevational cross-sectional view of the preliminary steel structure required before the reactor and its enclosure can be assembled and installed.

FIG. 5 is a cross section of the welded steel preliminary support structure 170 mounted on the foundation 82 over the bored shaft 14 adjacent to the drainage pipe 46 and the hopper 38.

Figure 6:
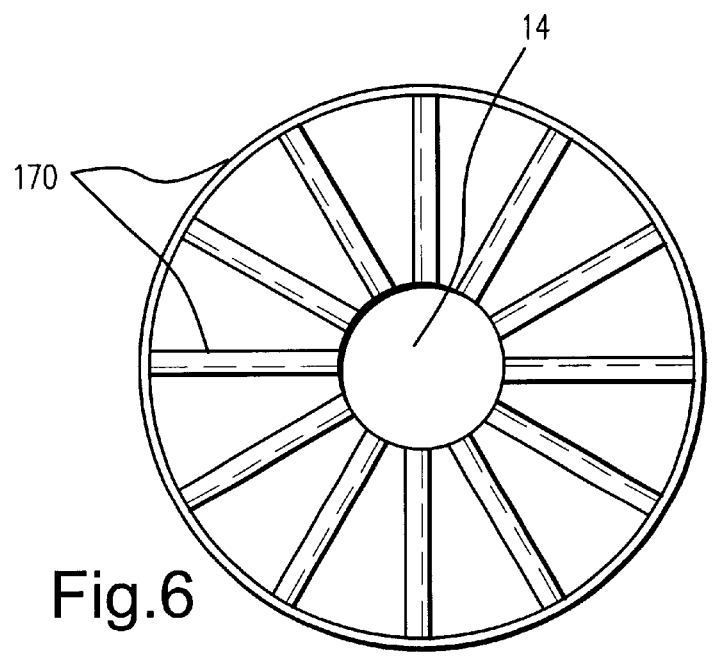
FIG. 6 is a top plan view of the preliminary structure of FIG. 5.

FIG. 6 is a view from above and looking down at the steel preliminary support structure 170. It has an opening in the center over the bored shaft 14 down through which all of the reactor and its main support structure has to be lowered by crane, one piece at a time.

Figure 7:
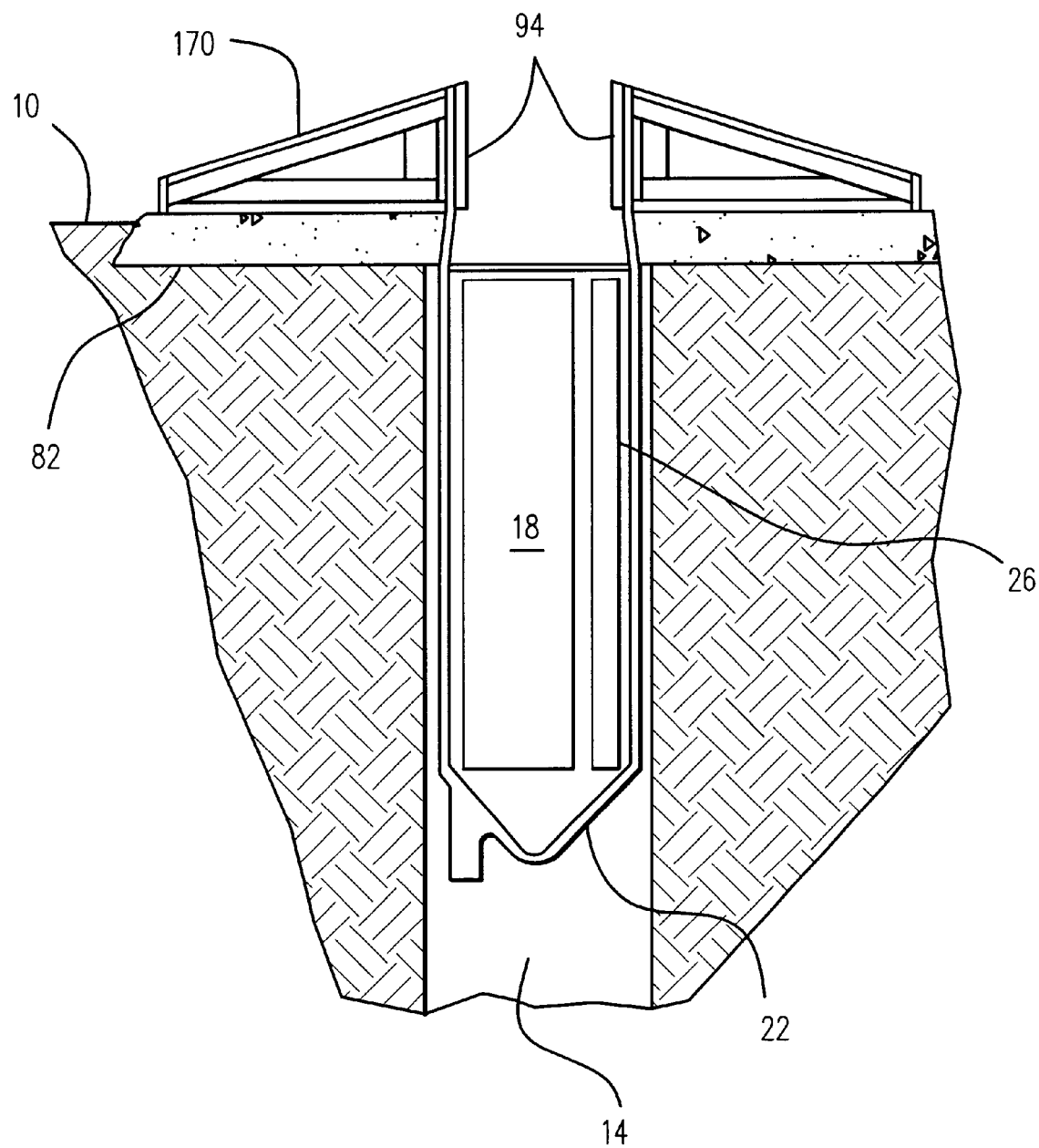
FIG. 7 is a side elevational cross-sectional view of the assembly of the reactor enclosure and the installation of the reactor.

FIG. 7 is a cross section of the envelope 22 and its contents, the heat exchanger 26 and the reactor 18. This diagram shows how the envelope 22 is suspended from the steel preliminary support structure 170.

The envelope 22 suspended in the bored shaft 14 is larger than the opening above. All of the structure and equipment below must be fabricated in sections small enough to be lowered through the access opening above and assembled in place. Work must be started at the top of the envelope by installing the top sections piece by piece. The assembly will preferably progress downward section by section until the nose section at the bottom is complete.

The section of the envelope 22 contacting the concrete foundation 82 is preferably tilted inboard approximately 5° from the vertical to give positive clearance on separation during the envelope drop. The tilted surface will preferably bear on the concrete foundation 82, giving lateral support and stability to the whole suspended unit during its years of working lifetime.

Preferably vertical ribs 94 give added strength to the upper section of the envelope 22. They play an important part in the separation of the envelope 22 (with its contents) from the steel preliminary support structure 170 above ground level 10.

The heat exchanger 26 and the atomic reactor 18 (without its nuclear fuel rods) must be lowered by crane through the opening at the top piece by piece (or subassembly by subassembly) and installed in place.

Figure 8:
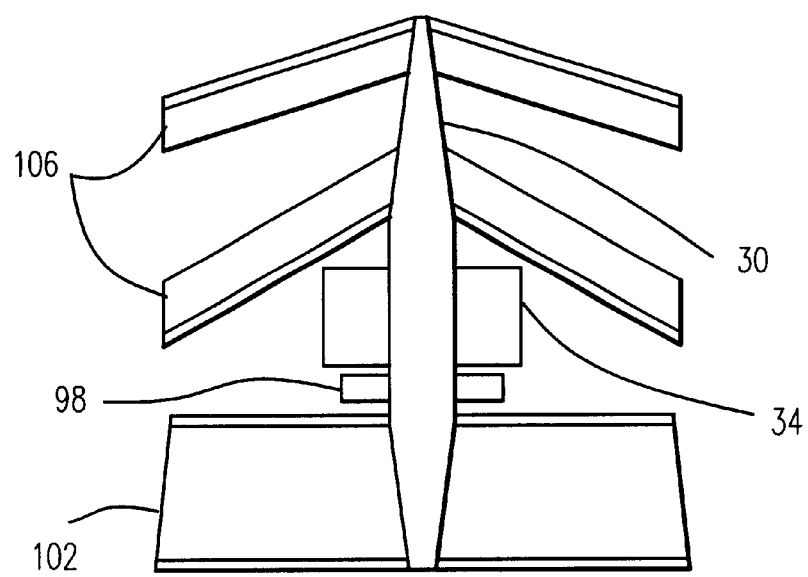
FIG. 8 is a side elevational view of the plug assembly required to seal the top of the reactor enclosure.

FIG. 8 is a cross section of a welded plug assembly. Its function is to permanently attach the suspended envelope to the preliminary steel support structure.

The plug assembly consists of a lower plug support structure 102, a steel stem 30, an explosive charge mount 98, an electric furnace 34 and an upper plug support structure 106.

The steel stem 30 is preferably a solid forged steel rod shaped member designed to be melted and severed when the need arises. It also supports the electrical furnace 34 and the explosive charge mounting 98.

The electric furnace 34 consists of a steel supporting structure, a brick firebox, blowers and heating elements. It is preferably round in shape and preferably completely encircles the steel stem. This provides uniform heating to the outside surface of the stem when the need arises. The top horizontal surface of the steel supporting structure of the electric furnace is attached by welding to the steel stem. The bottom horizontal surface of the steel supporting structure of the electric furnace is unattached and is free to slide up and down the steel stem. This results in a slip fit with the steel stem when it is severed by melting.

The explosive charge mount 98 is a structure that encircles the steel stem 30. Its function is to support a high explosive charge to sever the steel stem 30. This is a backup feature in case the electric furnace is damaged and cannot function. The actual explosive charge will normally be stored underground a safe distance away. It would be installed only when actually needed. It would be dangerous and unreliable to be installed in place below the furnace for long periods of the reactor's working lifetime.

Figure 9:
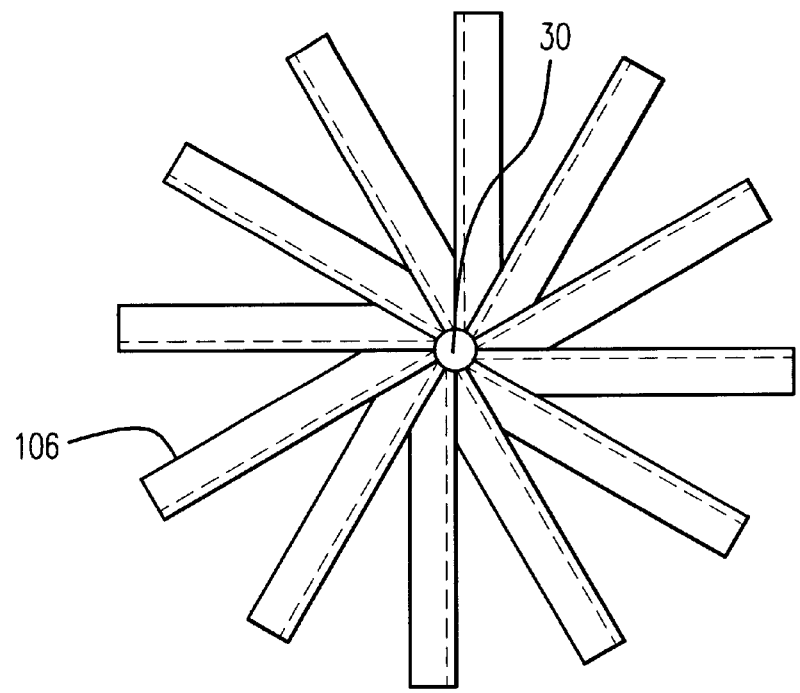
FIG. 9 is a top plan view of the plug assembly in FIG. 8.

FIG. 9 is a view of the plug assembly viewed from above and looking down at the assembly 106 and stem 30.

Figure 10:
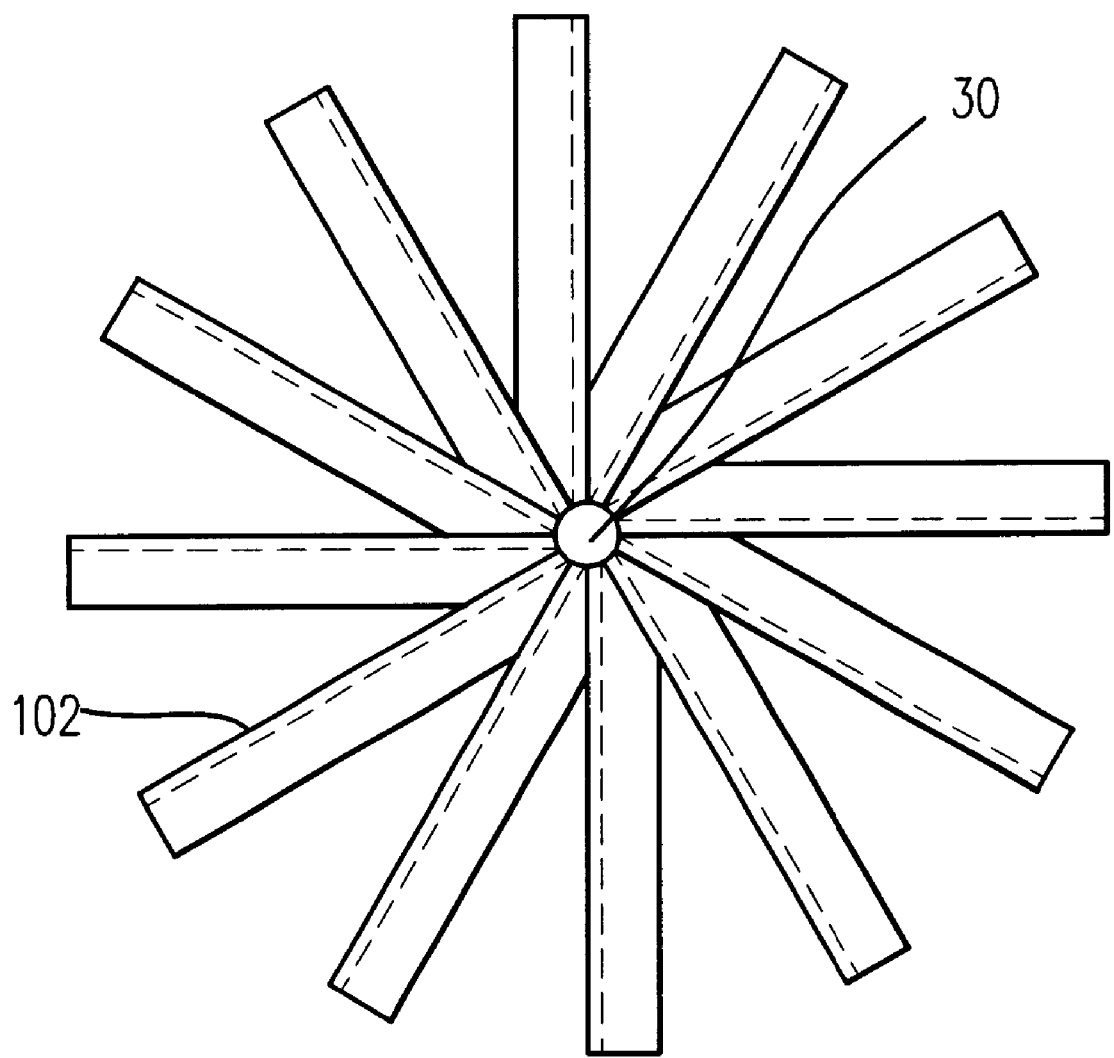
FIG. 10 is a bottom plan view of the plug assembly of FIG. 8.

FIG. 10 is a view of the plug assembly viewed from below and looking up at that assembly 102 and stem 30.

Figure 11:
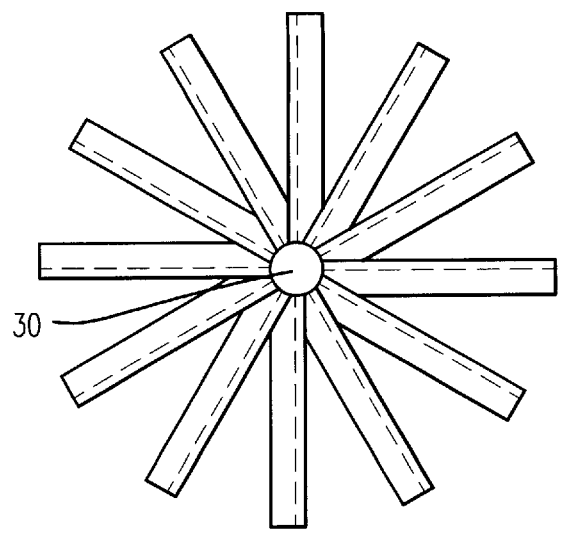
FIG. 11 is a top plan view of the plug assembly of FIG. 8 with one stem.

FIG. 11 is a view looking down at the top of the plug assembly showing a single round bar stem.

Figure 12:
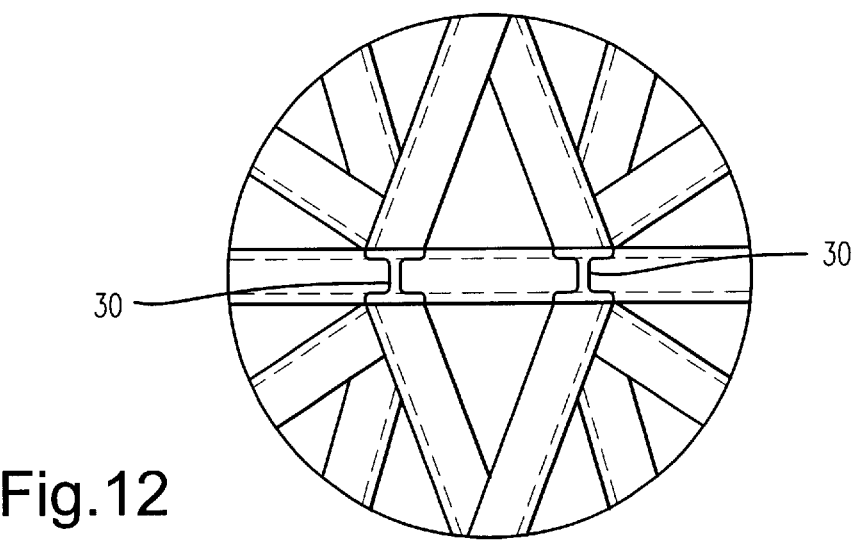
FIG. 12 is a top plan view of an alternative plug assembly with two stems.

FIG. 12 is a view looking down at the top of the plug assembly showing a double "I" beam stem.

Figure 13:
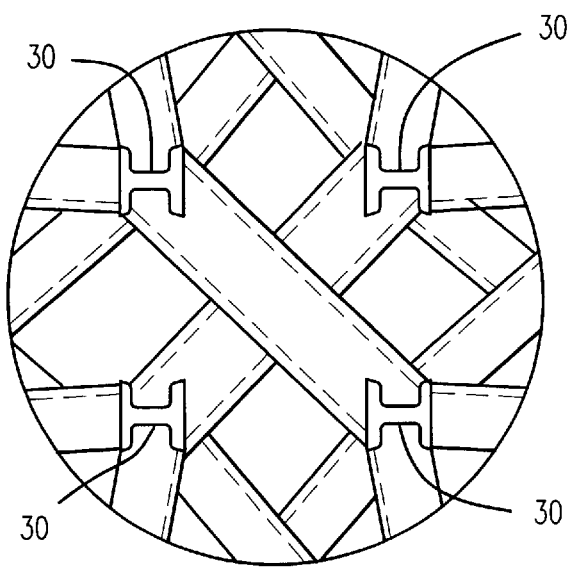
FIG. 13 is a top plan view of a plug assembly with four stems.

FIG. 13 is a view looking down at the top of the plug assembly showing a quadruple "I" beam stem.

Figure 14:
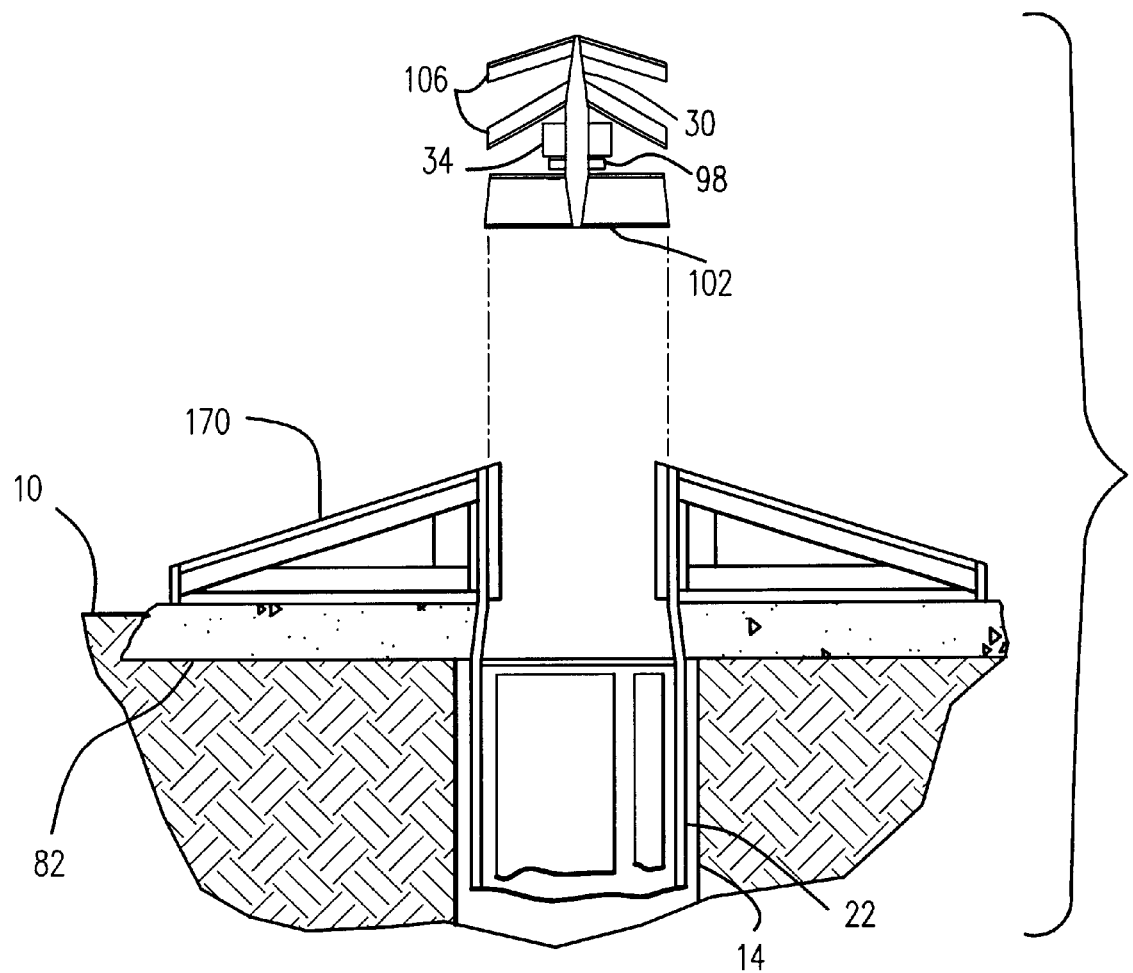
FIG. 14 is a side elevational cross-sectional conceptual drawing showing the installation of the plug assembly of FIG. 8.

FIG. 14 is a cross section showing how the plug assembly is inserted into the completed part of the installation.

The completed part of the installation includes the bored shaft 14 at ground level 10 with the concrete foundation 82. This is the base for the preliminary steel support 170 holding the envelope 22 with its contents.

The plug assembly includes the lower plug support structure 102, which has a cavity 110 (see FIG. 15), the explosive charge mount 98, the electric furnace 34, the steel stem 30 and the upper plug support structure 106.

This is only a conceptual diagram because the plug assembly will have to be installed piecemeal to fit down through the access opening on top.

Figure 15:
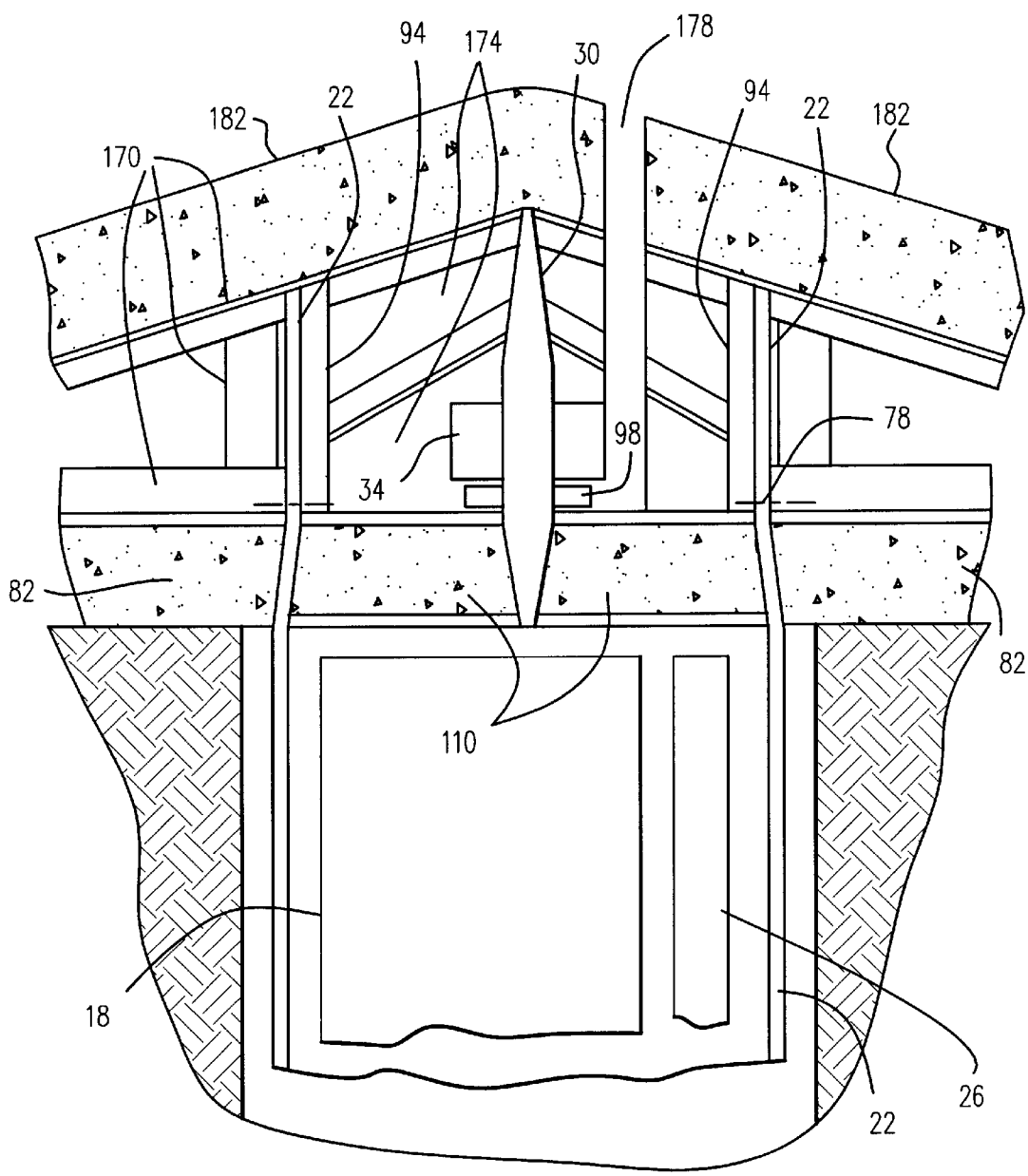
FIG. 15 is a side elevational cross-sectional view showing the plug assembly of FIG. 8, as installed.

FIG. 15 is a cross section of the invention after the plug assembly has been installed and the reactor is ready for the insertion of fuel rods and activation.

Assembly is accomplished as follows: first, the envelope 22 and its contents are suspended from vertical stiffener ribs 94 of the welded preliminary support structure 170 shown in FIG. 5.

The next step is to install the welded plug assembly shown in FIG. 8. This is assembled and installed in pieces and sub assemblies small enough to pass down through the opening at the top of the envelope 22.

Now the weight of the envelope and its contents are supported by a duplicate structure up through the steel stem 30 into the welded preliminary support structure 170.

The cavity 110 is filled with concrete. This, when coupled with the concrete foundation 82 will result in a complete concrete protective cover over the entire suspended reactor installation.

The envelope 22 and its stiffener ribs 94 are then cut, in the area indicated 78, with an acetylene cutting torch, completely around the periphery of the envelope 22.

This will result in all of the weight of the envelope 22 and its contents (the reactor 18 and the heat exchanger 26) being suspended from the stem 30.

The upper area 174 of the plug assembly will be preferably filled with sand.

A cap 182 of concrete will be preferably added on top of the installation. This will give added protection from any airborne or ground level bomb attack. The thickness of the cap 182 can be increased to whatever degree of protection is desired. An access passageway 178 must be installed from the top surface of the cap 182 down to above the cavity 110 in the plug assembly (which has been filled with concrete). This will provide access to monitor and maintain the electric furnace 34, to install the explosive charge in its structure 98 and to provide passageway for the steam lines, the water feed lines and the electrical supply lines to the reactor. All of these lines must have designs that would allow them to be manually disconnected or to be automatically disconnected when the envelope 22 is dropped.

Figure 16:
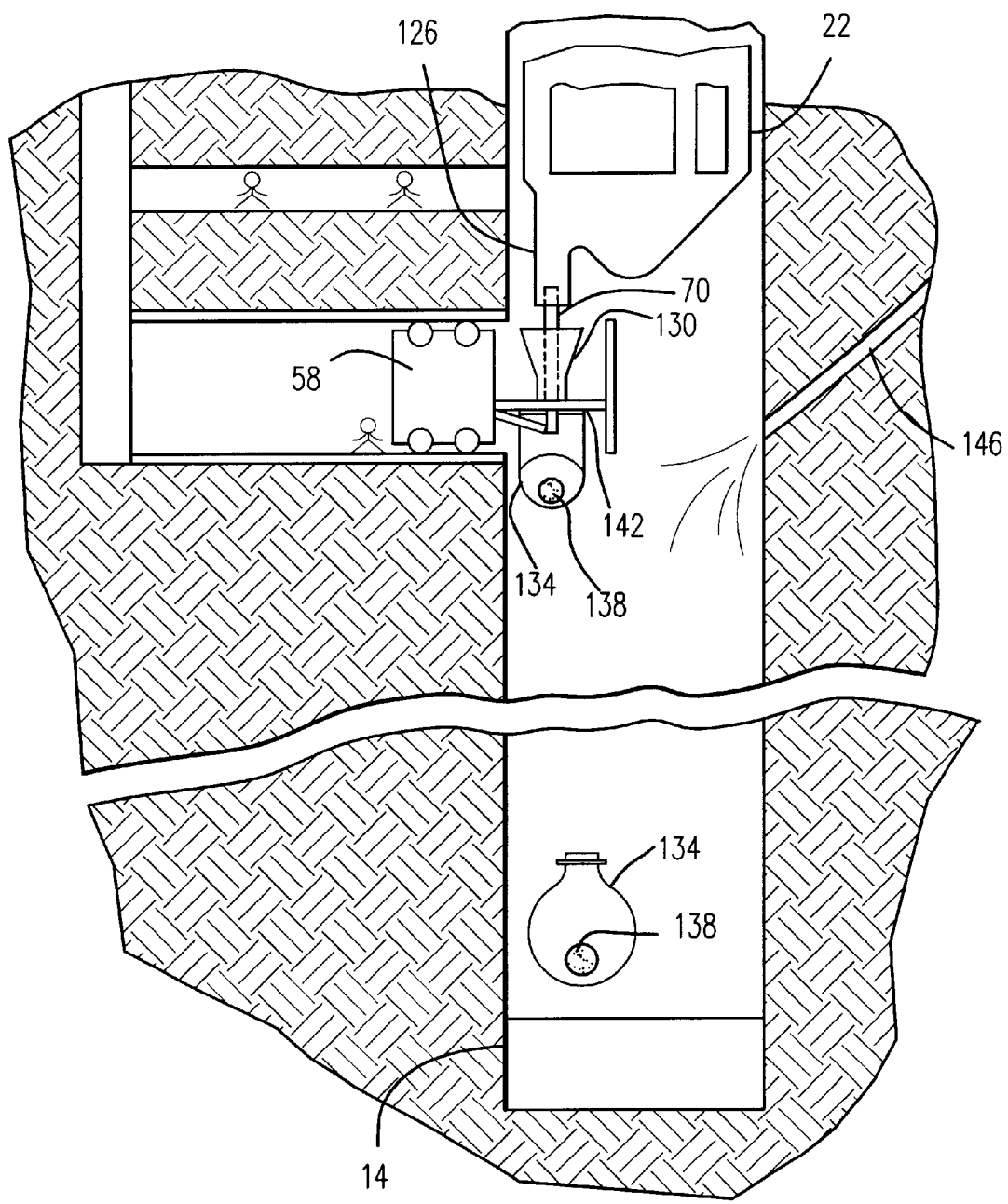
FIG. 16 is a side elevational cross-sectional view showing the processing of the depleted fuel rods by pulverizing them and mixing them with large amounts of filler.

FIG. 16 shows the process that pulverizes the spent depleted fuel rods and mixes them with a very large proportion of sand or earth. This eliminates their heat production and reduces their radiation level. All of these operations can be monitored and controlled remotely from above ground level.

First the spent fuel rods 70 are dropped from the envelope 22 through their exit chute 126. They then fall into the sand blasting machine hopper 130. Next they are fed into the sand blasting machine 58. The spent fuel particles coming from the sandblaster are mixed with sand and dropped into a large preferably fabric bag 134. This bag has a small remotely controlled explosive device 138 in the bottom. The bag preferably has a drawstring closure 142 at the top. A steady stream of sand or earth is released from the ground level and dropped down the supply pipe 146 during the pulverizing process to fall to the bottom of the bored shaft 14. A steady stream of this material can be assured by being fed from ground level by an auger feed or a stream of compressed air.

When a fuel rod is completely pulverized the bag 134 is closed by its draw string 142 and dropped to the bottom of the bored shaft 14. The impact of the bag 134 hitting the bottom will cause it to rupture spreading the mixture over the bottom. When the falling earth from above covers the spread mixture to a sufficient depth the remotely controlled explosive device 138 is activated. The small explosion further spreads the radioactive particles. As more earth falls, more insulation is added to the material at the bottom of the bored shaft.

Another method of pulverizing the spent fuel rods is to use a grinder in place of the sandblaster.

The bag 134 collects all of the fuel rod particles and carries all of the radiation to the bottom of the shaft. It does not contaminate the walls of the bored shaft near ground level.

Before the envelope 22 and its contents are dropped to their safe burial, it is desirable but not absolutely necessary to eject all fuel rods from the reactor and to process them to reduce their radiation. If an emergency does not allow the time to do this processing, the envelope can be dropped with the reactor fuel rods still in place.

Figure 17:
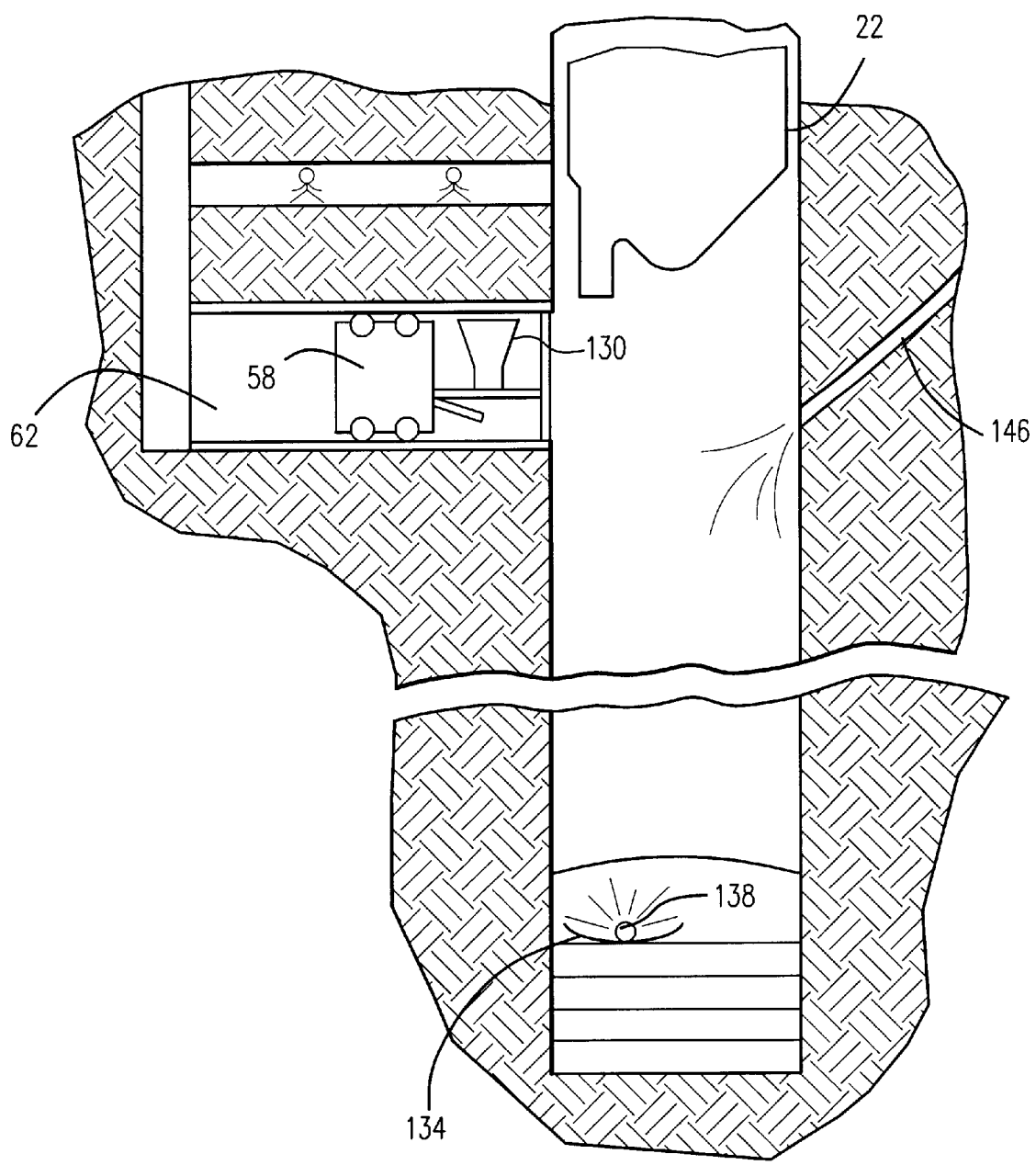
FIG. 17 is a side elevational cross-sectional view showing the stowed position of the machine that pulverizes the depleted fuel rods.

FIG. 17 shows the pulverizing machine 58 in the retracted position when not in use. In this position it is clear of the envelope 22 when it is dropped. Preferably, it is mounted on two rails on the floor and two rails in the ceiling. The unit may be extended to process the spent fuel rods and may be withdrawn when not in use. Preferably, the sand blaster hopper 130 fits inside the ceiling of its work area 62. The bag 134 has hit bottom and ruptured, spreading its mixture even more. More earth fill is falling from the supply pipe 146. The remotely actuated explosive device 138 is triggered adding more mixing and providing more insulation.

Any part or all of the pulverizing machine 58 may be rolled out and dropped down the shaft if it becomes radioactive. A new replacement must be installed. The unit is expendable.

Figure 18:
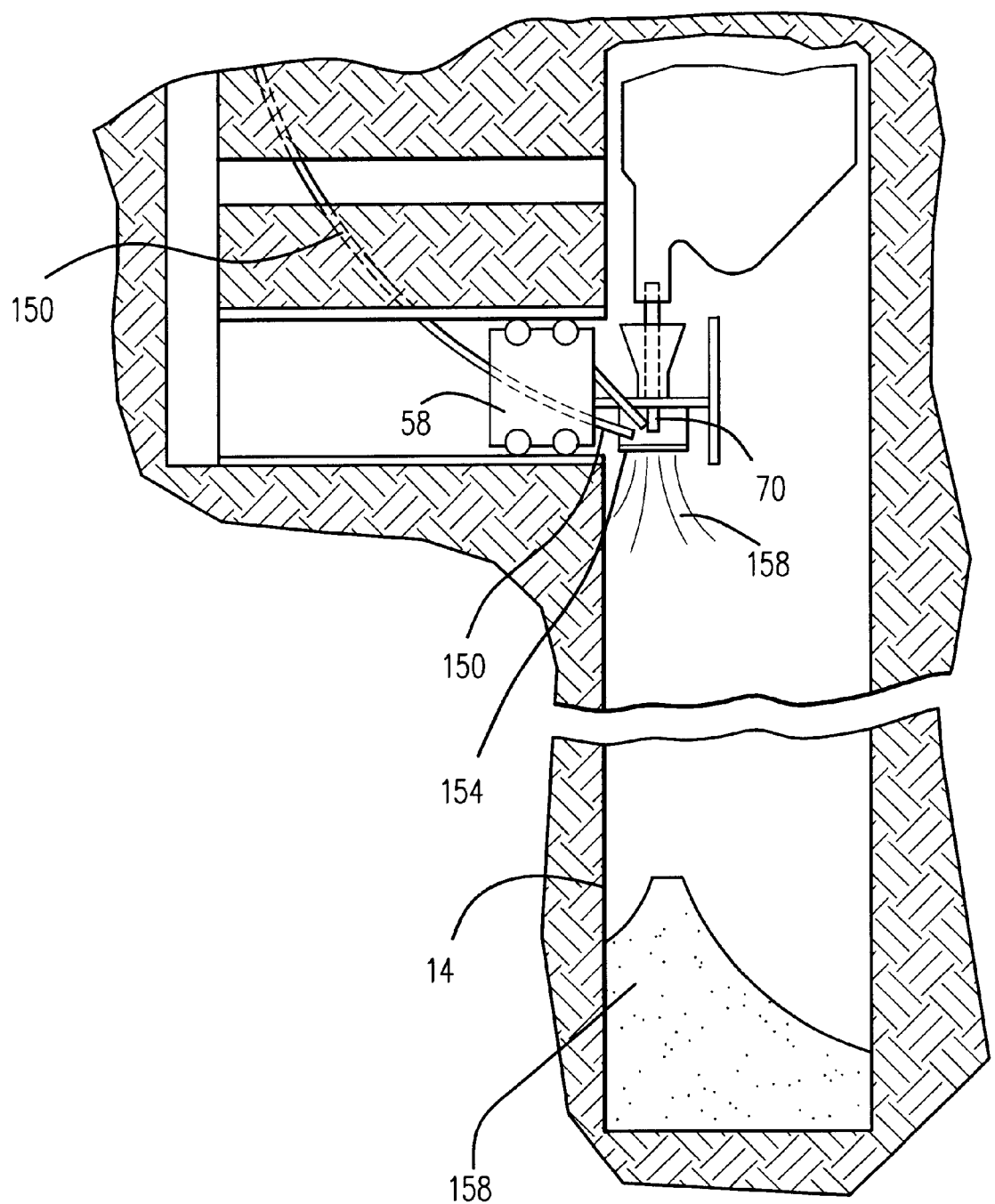
FIG. 18 is a side elevational cross-sectional view of an alternate method of further diluting the discarded fuel rod particles.

FIG. 18 is an alternative version of processing the spent fuel rods 70. They will be pulverized by either the sandblasting or grinder method. The particles are dropped into the shaker mixing box 154 (attached to the pulverizing machine 58). Also flowing into this box through a pipe 150 from ground level 10 is an earth filler or sand material. This will allow a much larger proportion of filler relative to the proportion of spent fuel rod particles. This mixture 158 falls directly out of the bottom of the shaker mixing box 154 down the bored shaft 14 and ends up at the bottom of the shaft.

This will result in a much lower radiation level because there is no limit to the proportion of earth filler added to the proportion of fuel rod particles.

The final result would be a buried mixture with no heating properties and with radiation levels equal to the ore from which the fuel rods were mined, or at least with acceptable levels of heat and radiation. If an installation will process fuel from more than one nuclear plant, the bored shaft must be commensurately deeper to accommodate the extra volume of mixture.

Figure 19:
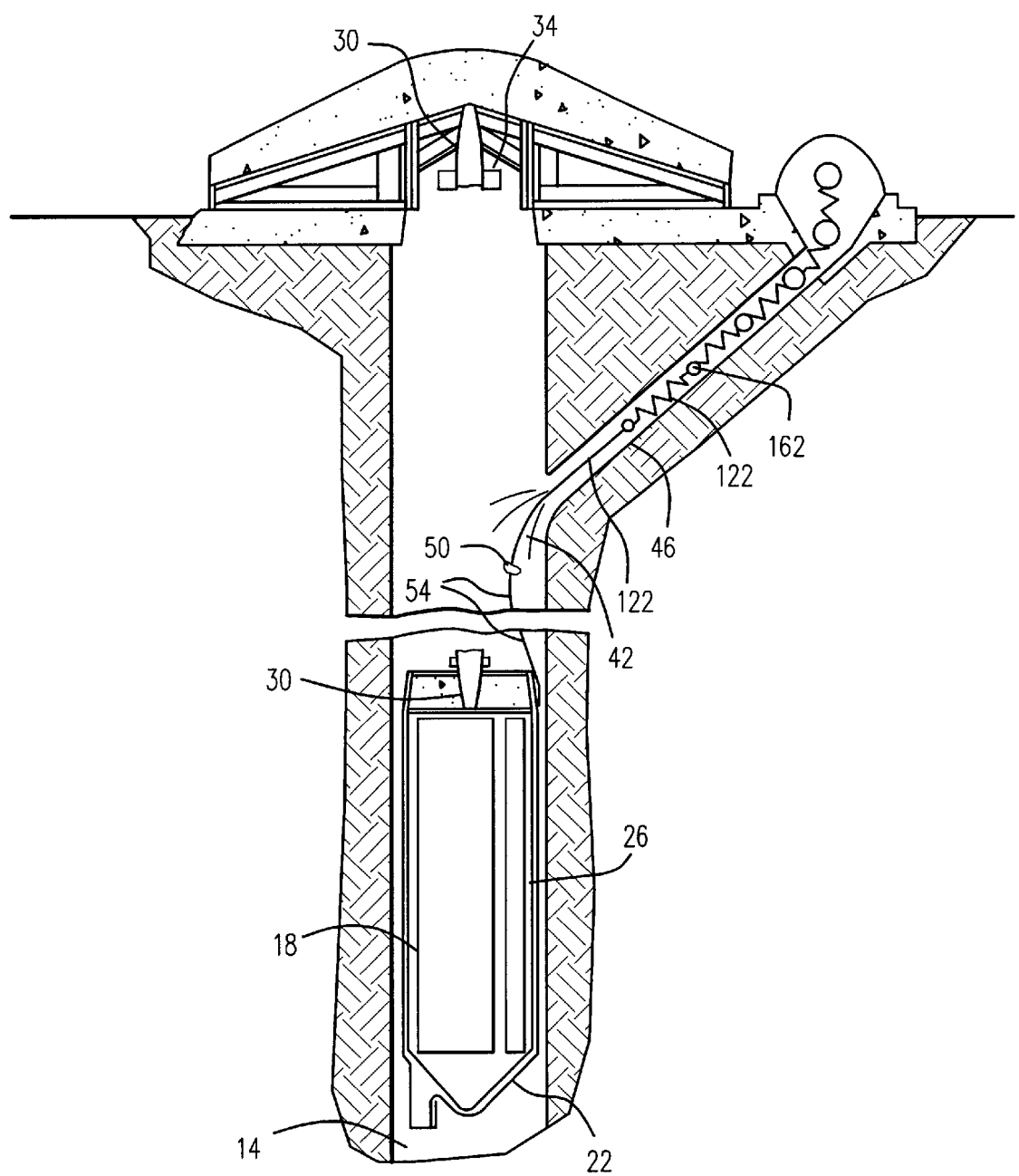
FIG. 19 is a side elevational cross-sectional view of the initial phase of the drop of the enclosure that starts the flow of a layer of insulating sand.

FIG. 19 is a cross section of the suspended reactor installation moments after the steel stem 30 has been severed by melting in the electric furnace 34. The envelope 22 containing the reactor 18 and the heat exchanger 26 has started its final drop.

The fiberglass breakaway tear away sand gate 50 is torn away by the pull of the cable 54 attached to the envelope 22. The fine sand 42 starts to flow from the drainage pipe 46 into the bored shaft 14. The flow of the stream of sand 42 is assured by the action of the ball shaped round wire brushes 162, and their interconnecting cables 122 as they move along their path. This will break up any long time caking of the sand.

Figure 20:
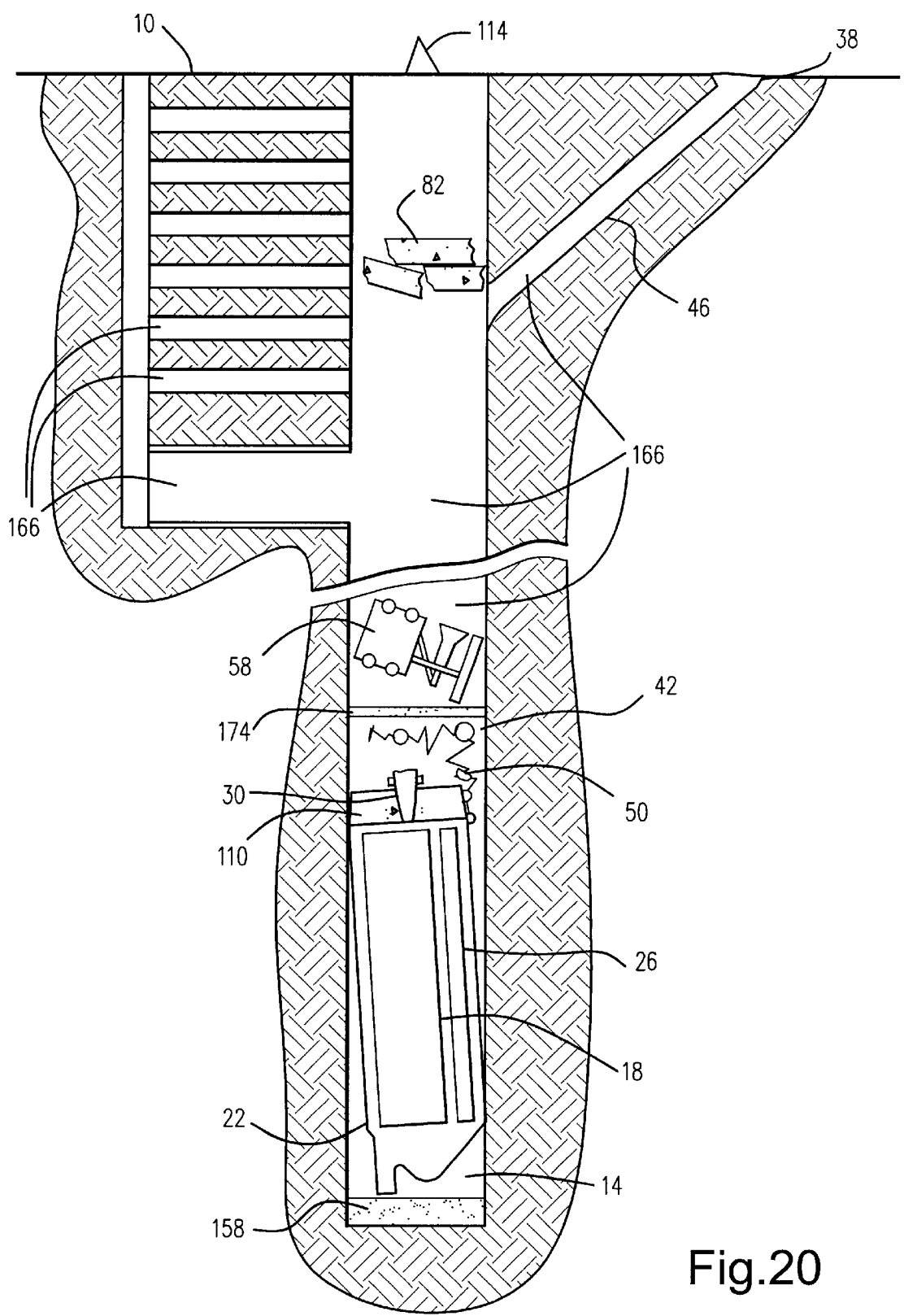
FIG. 20 is a side elevational cross-sectional view showing the final disposition of all dangerous radioactive elements to a safe burial deep underground.

FIG. 20 shows the reactor installation after the steel stem 30 has been severed. The envelope 22 with its contents, the reactor 18 and heat exchanger 26, have dropped to a permanent safe burial on top of the processed discarded fuel rods and its mixture 158. The drop of the envelope has caused the rupture of the breakaway tear away sand gate 50, allowing the sand 42 (in the drainage pipe 46 and hopper 38) to fall down the bored shaft 14 on top of the envelope 22. The sand 174 that filled the cavity above the concrete 110 in the plug assembly and surrounded the steel stem will be free to fall down the bored shaft 14. The fuel rod processing machine 58 is discarded by dropping it down the bored shaft 14.

All of the steel structure remaining at the top of the bored shaft at ground level 10 must be removed and scrapped. It is not radioactive.

Earth fill 166 is funneled down the hopper 38 until the bored shaft is filled to the bottom of the drainage pipe 46.

The concrete foundation 82 is broken up and dropped down the bored shaft 14.

The remaining portion of the bored shaft, the work areas and elevator are filled with earth fill 166.

At the ground level 10 there is installed a bronze plaque 114 telling future generations of what lies buried beneath this spot.

The present invention provides a wide latitude in locating the nuclear reactor relative to the other units of the electric generating plant. If a reactor becomes unusable for any reason it (as an independent interchangeable unit) can be replaced by a new unit at any reasonable distance away. The expensive turbines, generators, cooling towers and matrix of existing power grids are unaffected by radiation and can still be used.

Figure 21:
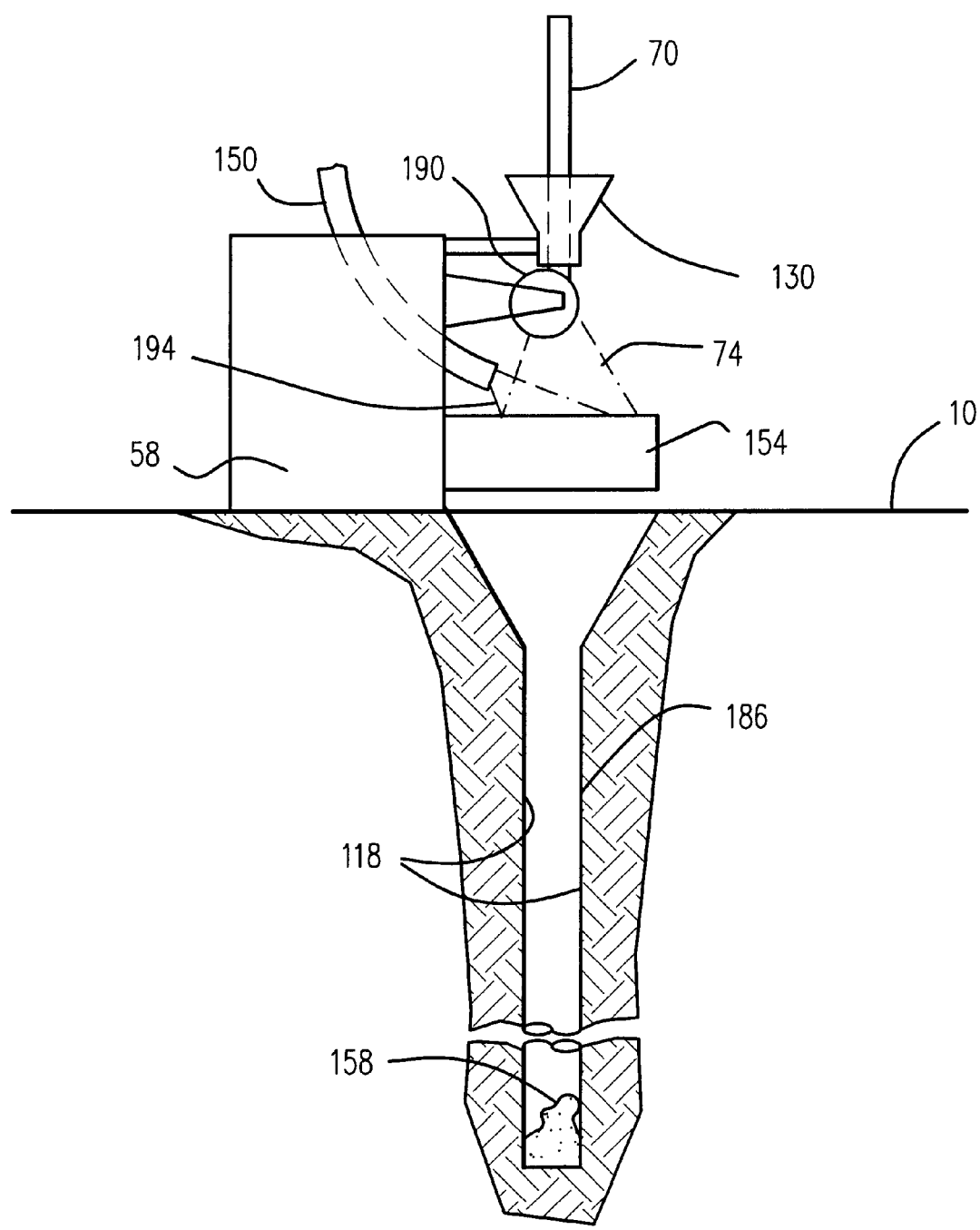
FIG. 21 is a side elevational cross-sectional view of a separate waste fuel rod processing installation located adjacent to an existing nuclear reactor or a waste fuel rod storage facility.

FIG. 21 is a separate installation incorporating the depleted waste fuel rod processing feature shown in FIG. 18. This installation should be located conveniently near the stockpile of waste fuel rods to be processed.

This processing would render safe and harmless any dangerous waste fuel rods presently in storage or produced in the future worldwide. These processed waste fuel rods would be non-heat producing and with a low specified radiation level. The more dilute (with sand or loose earth) the lower the radiation level. The only limiting factor would be the expense of the filler and providing its underground disposal space.

This separate installation is to be located over a small bored vertical shaft 186. That small bored vertical shaft is coated with a water proof sealant 118 down to a level below ground water. This assures that ground water is never contaminated by radiation.

At ground level 10 over the small bored vertical shaft 186, there is installed the shaker mixing box 154 attached to the pulverizing machine 58. Also attached to the shaker mixing box 154 is a grinder attachment 190 and a waste fuel rod receiving hopper 130.

The actual processing begins by inserting the to be processed depleted waste fuel rod 70 into the waste fuel rod receiving hopper 130. The grinder attachment 190 pulverizes the waste fuel rod 70. The resulting fuel rod particles 74 fall into the shaker mixing box 154. The shaker mixing box 154 thoroughly mixes the two substances and drops the mixture 158 down through the screened bottom of the box. That mixture ends up at the bottom of the shaft 186.

When the desired number of rods are processed, the bored vertical shaft is plugged with loose earth. The installation is moved to its next location to process another series of waste fuel rods.

The mobility of this unit eliminates the danger of accidents that can happen when transporting the fuel rods to a single disposal site.

INDUSTRIAL APPLICABILITY

This invention may be used wherever it is desired to locate a nuclear reactor and to dispose of the resulting nuclear waste (including the reactor itself) without the necessity of transporting that waste.

What is claimed is:

1. A device comprising:
   an underground vertical shaft having a top and a bottom;
   a nuclear reactor envelope suspended in said shaft at said top;
   a nuclear reactor in said envelope;
   an activatable release mechanism to release said nuclear reactor envelope when desired;
   whereby activating said release mechanism causes said nuclear reactor envelope and said nuclear reactor to fall down to said bottom of said shaft further comprising a drainage pipe having an upper end and a lower end, said upper end being accessible from ground level and said lower end opening into a lower portion of said vertical shaft;
   flowable material located in said drainage pipe and adjacent to said upper end;
   an activatable gate abutting against said lower end, operably connected to said nuclear reactor, whereby falling of said nuclear reactor past said lower end activates said gate and causes said flowable material to flow through said drainage pipe into said vertical shaft on top of said nuclear reactor.

2. A device according to claim 1, further comprising:
   a supply pipe having an upper portion accessible from ground level and a lower portion opening into said vertical shaft below said reactor, whereby filler placed in said supply pipe falls out of said lower portion and into said vertical shaft;
   a pulverizing device positioned below said lower portion for pulverizing spent nuclear fuel to form pulverized nuclear fuel, positioned in said shaft below said lower portion of said supply pipe, whereby said pulverized fuel mixes with said filler and falls to said bottom of said shaft.

3. A device according to claim 2, wherein said pulverizing device mixes said pulverized nuclear fuel with said filler to form a mixture and places said mixture in a bag.

4. A device according to claim 2, wherein said pulverizing device is selected from the group consisting of a sand blasting machine and a grinder.

5. A device, comprising:
   a vertical shaft approximately 1200 feet deep and approximately 60 feet in diameter having a top and a bottom;
   a support structure at the top of the shaft;
   at least one stem extending downwardly from the support structure;
   a nuclear reactor envelope suspended from the stem over the shaft;
   a nuclear reactor enclosed in the envelope;
   a release mechanism operably connected to the stem, whereby activating said release mechanism severs the stem and causes the reactor and the envelope to fall to the bottom of the shaft;
   a drainage pipe having an upper end and a lower end, the upper end being accessible from ground level and the lower end opening into a lower portion of said vertical shaft;
   a hopper attached to the upper end;
   flowable material located in the drainage pipe and the hopper;
   an activatable gate abutting against the lower end operably connected to the nuclear reactor envelope, whereby falling of the nuclear reactor envelope past the lower end activates the gate and causes the flowable material to flow through the drainage pipe into the vertical shaft and to fall on top of the nuclear reactor envelope and the nuclear reactor;
   a supply pipe having an upper portion accessible from ground level and a lower portion which opens into the vertical shaft, whereby filler placed into the supply pipe falls out of the lower portion and into the vertical shaft;

a pulverizing device positioned below the lower portion for pulverizing spent nuclear fuel to form pulverized nuclear fuel, positioned near the shaft below the nuclear reactor envelope, whereby the pulverized nuclear fuel and filler can fall into the shaft;

wherein the pulverizing device mixes the pulverized nuclear fuel with the filler to form a mixture and places the mixture in a bag;

wherein the pulverizing device is selected from the group consisting of a sand blasting machine and a grinder.

6. A device according to claim 5, wherein the flowable material is dry sand.

7. A device according to claim 6, wherein surfaces of the gate, the hopper and the drainage pipe in contact with the flowable material are coated with waterproof sealant.

8. A device according to claim 5, wherein the release mechanism is selected from the group comprising an electric furnace and explosives.

9. A device according to claim 5, further comprising additional stems between the nuclear reactor envelope and the support structure.

* * * * *